(12) United States Patent
Paisley

(10) Patent No.: US 10,562,459 B2
(45) Date of Patent: Feb. 18, 2020

(54) LADDER STORAGE ASSEMBLY

(71) Applicant: Darrell Cory Paisley, Cowichan Bay (CA)

(72) Inventor: Darrell Cory Paisley, Cowichan Bay (CA)

( * ) Notice: Subject to any disclaimer, the term of this patent is extended or adjusted under 35 U.S.C. 154(b) by 58 days.

(21) Appl. No.: 15/932,243

(22) Filed: Feb. 16, 2018

(65) Prior Publication Data

US 2018/0229664 A1 Aug. 16, 2018

Related U.S. Application Data

(60) Provisional application No. 62/600,182, filed on Feb. 16, 2017.

(51) Int. Cl.
| | |
|---|---|
| *B60R 9/048* | (2006.01) |
| *B60R 7/08* | (2006.01) |
| *E06C 7/50* | (2006.01) |
| *F16M 13/02* | (2006.01) |
| *E06C 5/24* | (2006.01) |
| *F16B 5/00* | (2006.01) |
| *F16B 7/04* | (2006.01) |
| *F16B 21/09* | (2006.01) |

(52) U.S. Cl.
CPC ............. *B60R 7/08* (2013.01); *B60R 9/0485* (2013.01); *E06C 5/24* (2013.01); *E06C 7/50* (2013.01); *F16M 13/02* (2013.01); *F16B 5/0072* (2013.01); *F16B 7/0433* (2013.01); *F16B 7/0473* (2013.01); *F16B 21/09* (2013.01)

(58) Field of Classification Search
CPC ....... B60R 9/0485; B60R 9/0423; B60R 7/08; E06C 5/24; E06C 7/50; F16B 5/0072; F16B 7/0433; F16B 7/0473
See application file for complete search history.

(56) References Cited

U.S. PATENT DOCUMENTS

| | | |
|---|---|---|
| 2,642,217 A | 6/1953 | Jennings |
| 2,647,677 A | 8/1953 | Reed |
| 3,434,566 A | 3/1969 | Miller |

(Continued)

FOREIGN PATENT DOCUMENTS

| | | |
|---|---|---|
| GB | 2298568 | 9/1996 |
| WO | 2005026490 | 3/2005 |
| WO | 2012122130 | 9/2012 |

OTHER PUBLICATIONS

"Jet Rack: Interior Ladder Storage System" brochure; WSHII, LLC. Date of publication: (unknown) though brochure indicates that product won an award in 2005.

(Continued)

*Primary Examiner* — Derek J Battisti
(74) *Attorney, Agent, or Firm* — Cameron IP

(57) ABSTRACT

The present invention relates to a storage assembly for storing a foldable ladder within a structure. The assembly includes a first protrusion connectable to first rails of the ladder. The assembly includes a second protrusion connectable to second rails of the ladder. Each of the protrusions includes an enlarged distal end portion. The assembly includes a linear guide track connectable to the structure and to which the distal end portions of the protrusions are slidably received and retained when the ladder is in a folded position. The ladder couples to the structure thereby.

19 Claims, 11 Drawing Sheets

(56) References Cited

U.S. PATENT DOCUMENTS

| | | | |
|---|---|---|---|
| 3,888,398 A | 6/1975 | Payne | |
| 4,139,078 A | 2/1979 | Keller | |
| 4,576,319 A | 3/1986 | Brown | |
| 4,592,527 A | 6/1986 | Karapita | |
| 4,846,303 A | 7/1989 | Cooper et al. | |
| 4,915,437 A | 4/1990 | Cherry | |
| 5,172,952 A * | 12/1992 | Lasnetski | B60R 5/006 |
| | | | 182/127 |
| 5,366,052 A | 11/1994 | Keh-Lin | |
| 5,402,979 A * | 4/1995 | Bellamy | B60R 11/00 |
| | | | 182/127 |
| 6,073,725 A | 6/2000 | Kumher et al. | |
| 6,105,720 A | 8/2000 | Kumher et al. | |
| 6,155,440 A | 12/2000 | Arce | |
| 6,315,078 B1 | 11/2001 | Kumher et al. | |
| 6,315,181 B1 | 11/2001 | Bradley et al. | |
| 6,672,494 B1 * | 1/2004 | Fernandez | A45F 3/14 |
| | | | 182/129 |
| 7,681,853 B2 * | 3/2010 | Trusty | E06C 1/005 |
| | | | 182/127 |
| 8,534,621 B1 * | 9/2013 | Anderson | E06C 1/12 |
| | | | 182/129 |
| 8,814,095 B2 * | 8/2014 | Neumann | B61D 17/048 |
| | | | 244/131 |
| 8,851,234 B2 * | 10/2014 | Bachorski | A45F 5/102 |
| | | | 16/422 |
| 9,016,750 B2 * | 4/2015 | Izydorek | B60R 9/042 |
| | | | 296/37.6 |
| 9,022,263 B1 * | 5/2015 | Russell | A61G 3/0858 |
| | | | 224/281 |
| 2003/0080586 A1 * | 5/2003 | Ehrlich | B60P 7/15 |
| | | | 296/191 |
| 2005/0139559 A1 | 6/2005 | Trusty et al. | |
| 2005/0196258 A1 | 9/2005 | Stabs | |
| 2008/0308694 A1 * | 12/2008 | Gorman | E06C 7/50 |
| | | | 248/210 |
| 2009/0283484 A1 | 11/2009 | Trusty et al. | |
| 2010/0025348 A1 | 2/2010 | Burgess et al. | |
| 2011/0073729 A1 | 3/2011 | DeSautel | |
| 2013/0291362 A1 | 11/2013 | Sutton | |

OTHER PUBLICATIONS

Jet Rack Installation/User Instructions; WSH 2, LLC. Date of publication: (unknown).

* cited by examiner

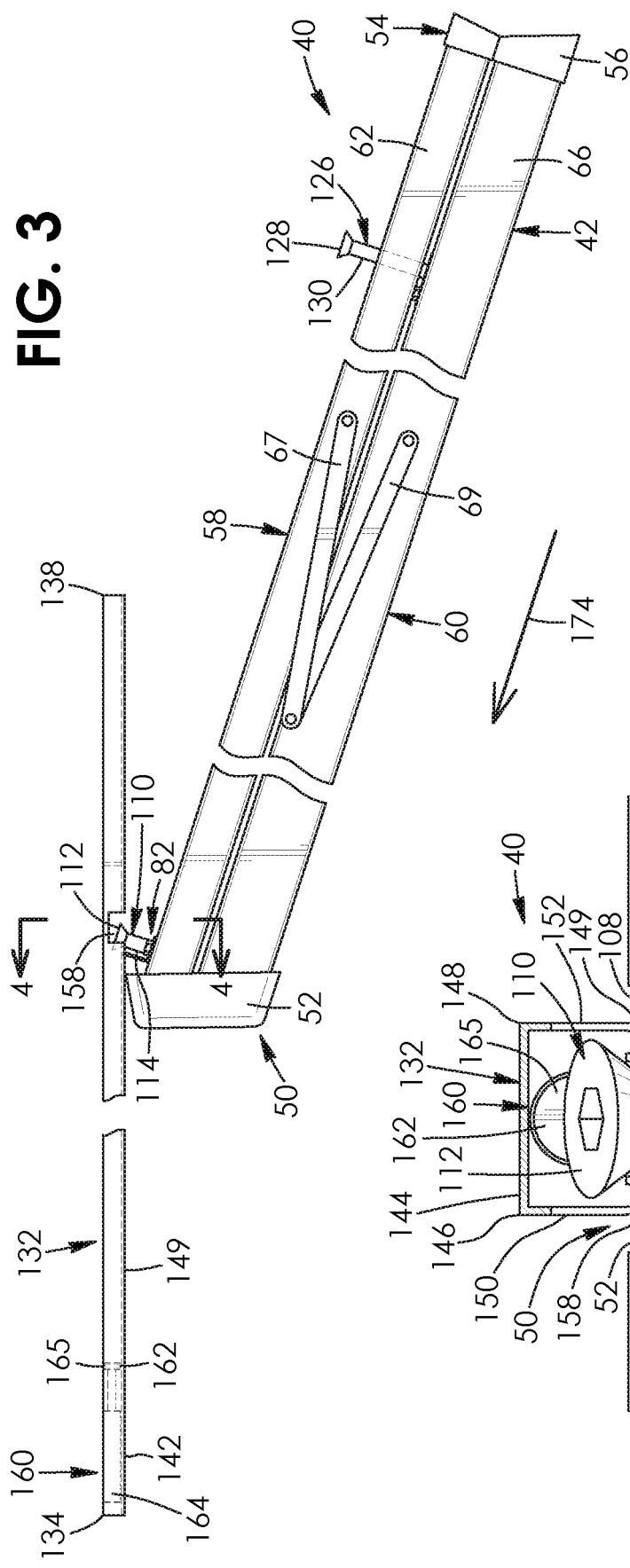

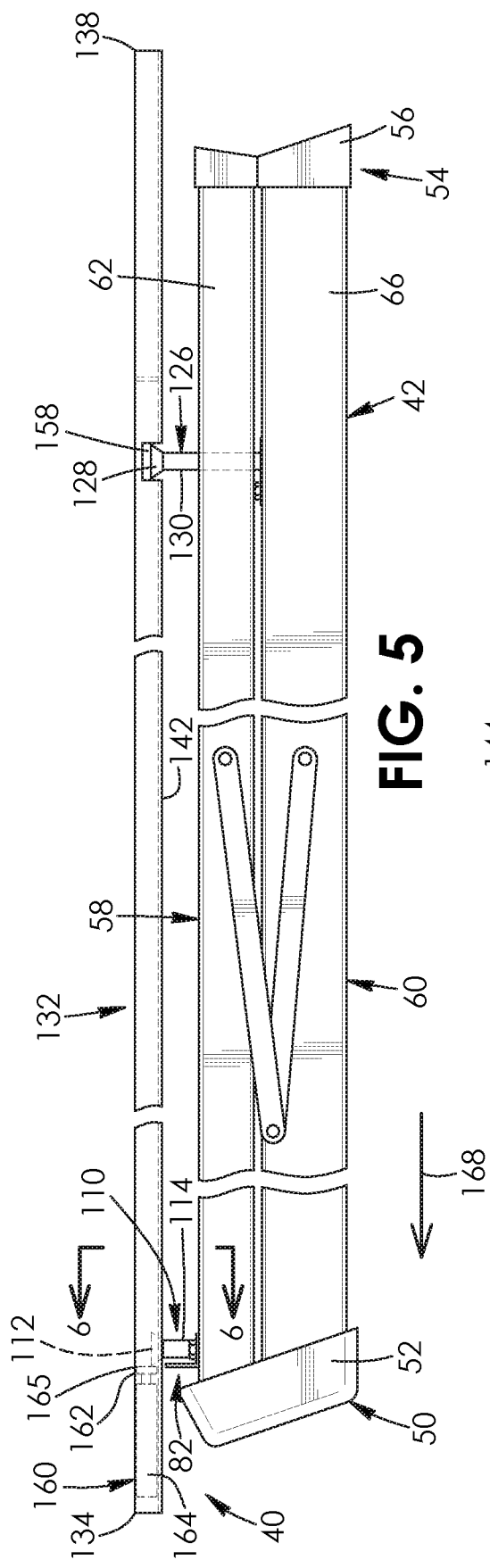
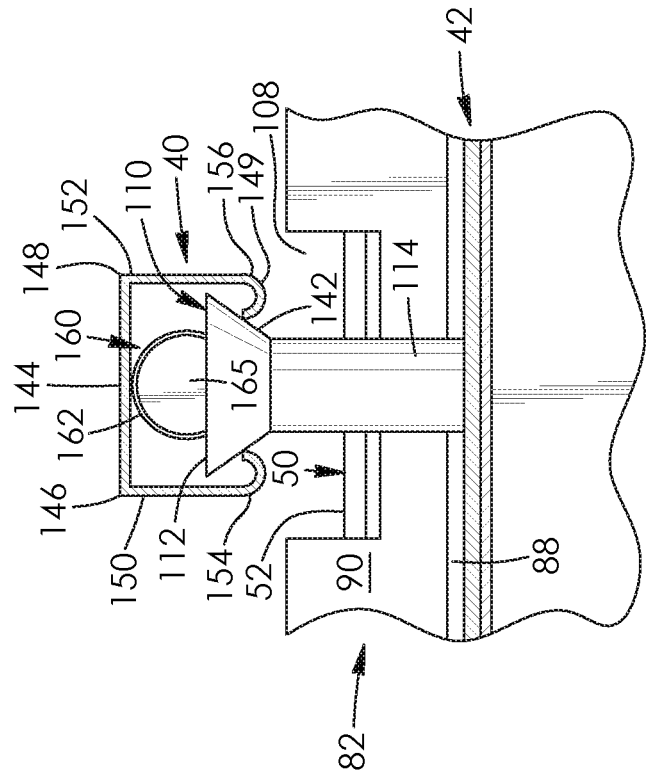

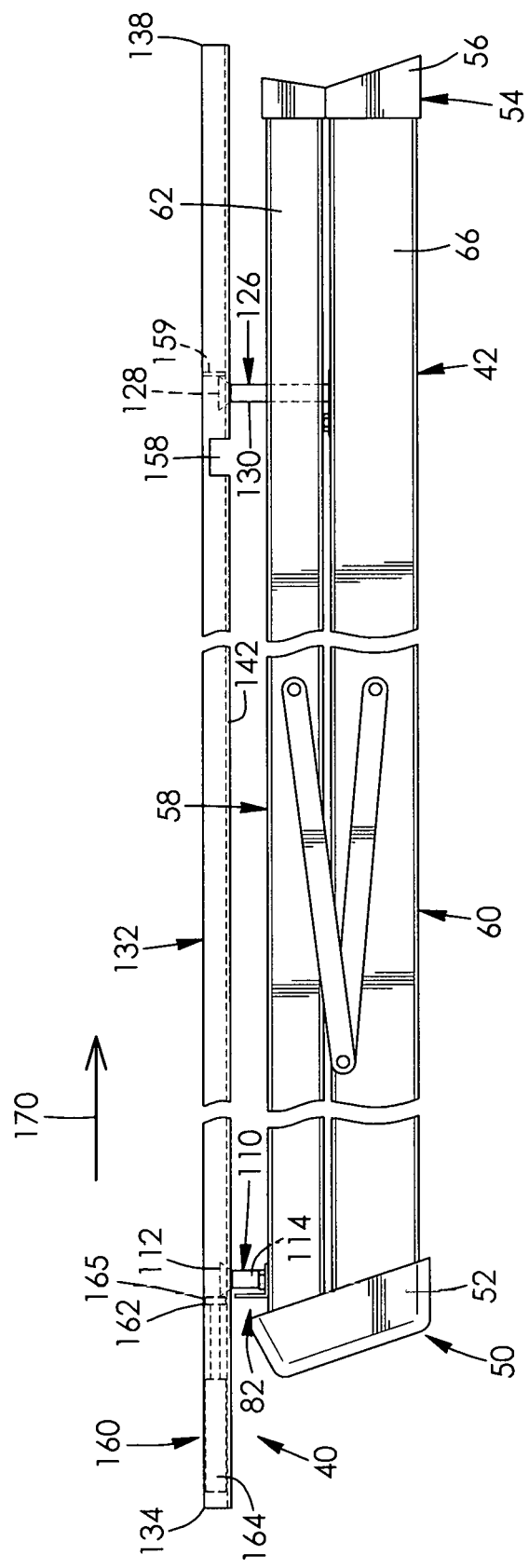

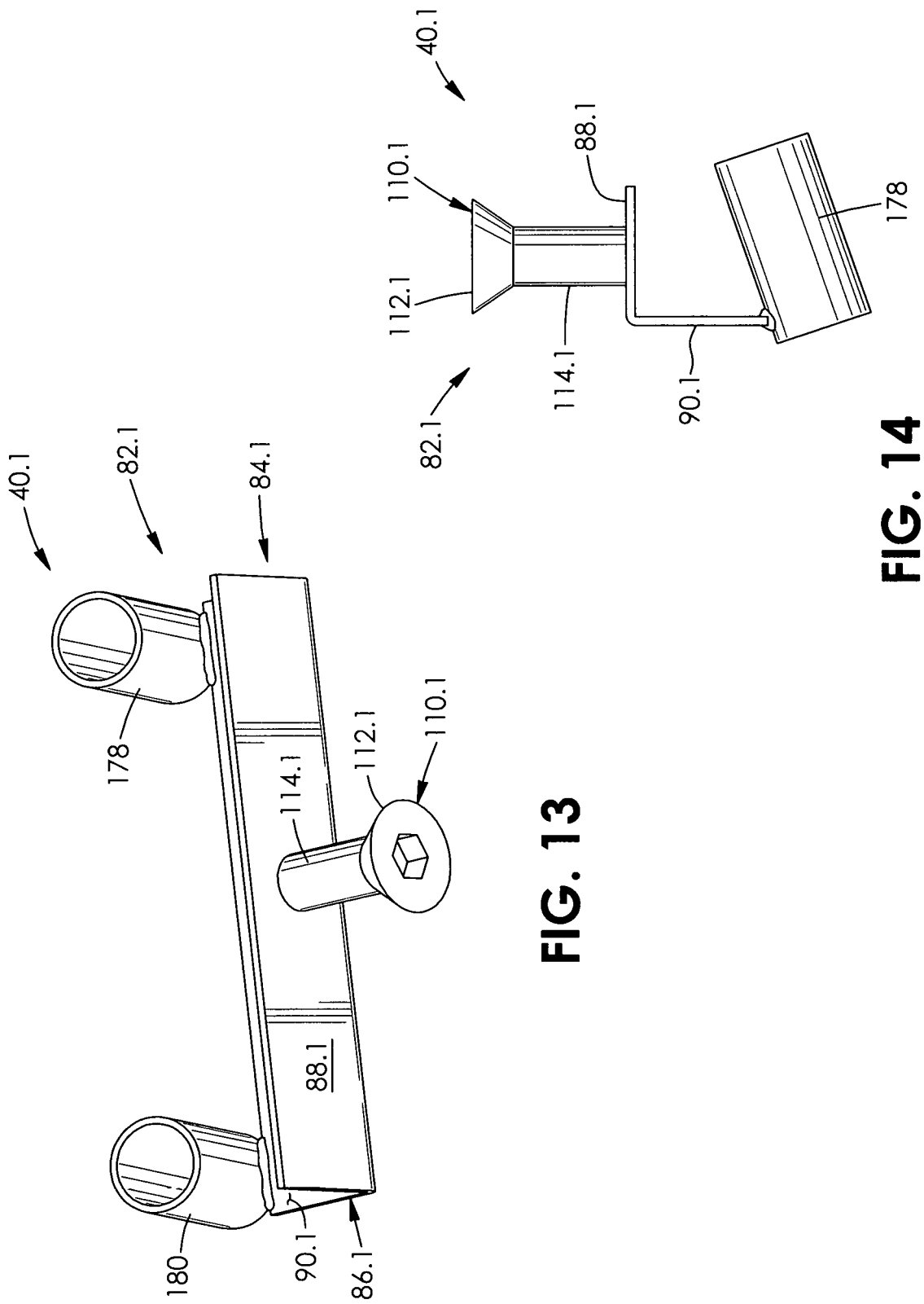

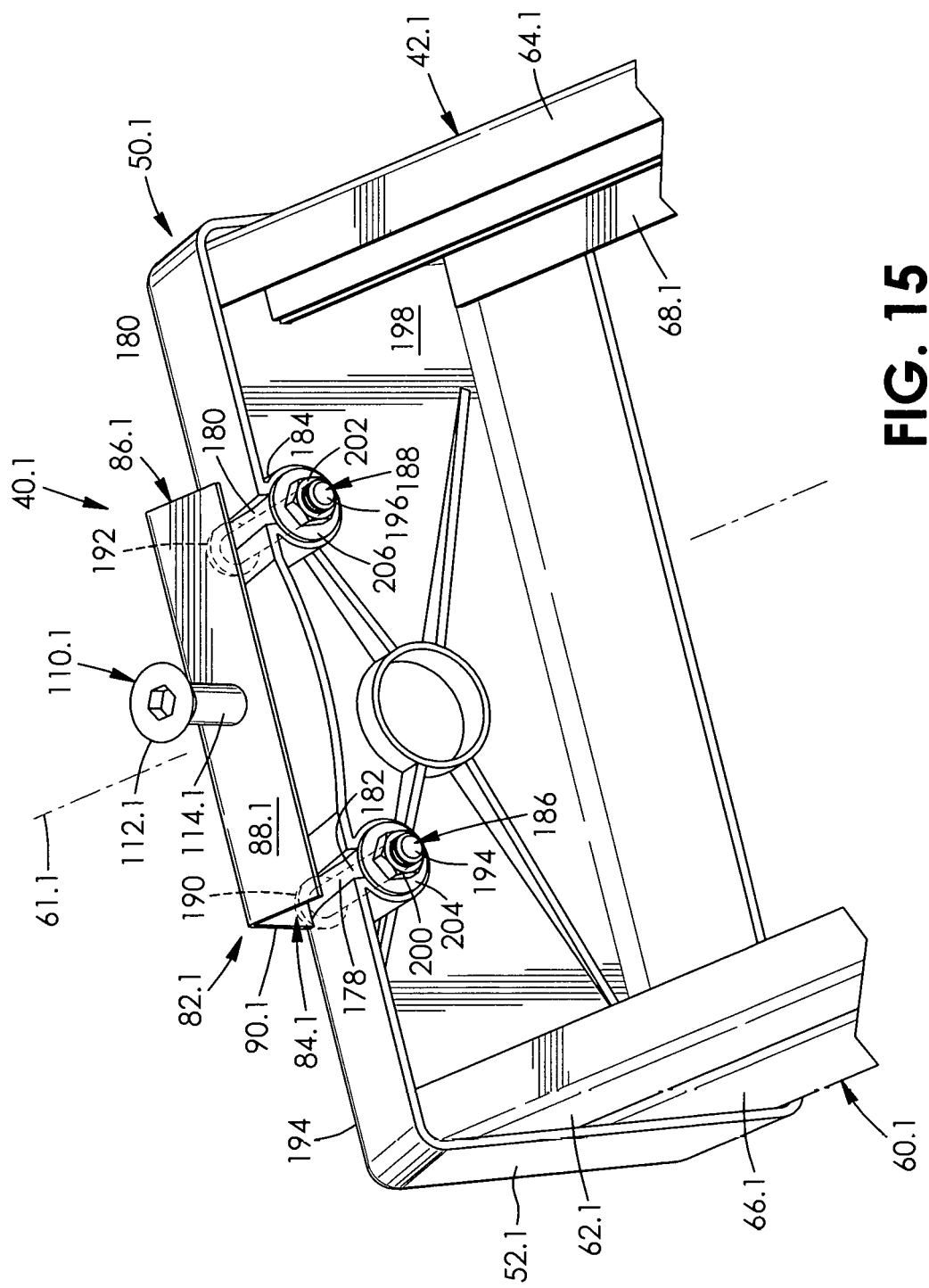

LADDER STORAGE ASSEMBLY

CROSS REFERENCE TO RELATED APPLICATION

This application claims the benefit of provisional application No. 62/600,182 filed in the United States Patent and Trademark Office on Feb. 16, 2017, the disclosure of which is incorporated herein by reference and priority to which is claimed.

FIELD OF THE INVENTION

The present invention relates to a storage assembly. In particular, the invention relates to a ladder storage assembly.

DESCRIPTION OF THE RELATED ART

U.S. Pat. No. 5,172,952 to Lasnetski discloses a rack for use in automotive vehicles or other storage areas for supporting a ladder or similar device hanging from an overhead support such as a ceiling. A roller track is provided for the movable support at one end of the ladder, and a sling supports the opposite end.

U.S. Pat. No. 7,681,853 to Trusty et al. discloses a ladder and equipment storage rack and method. In one form of the invention, a ladder and equipment rack is provided with mounts that connect to struts or other hanger devices to easily adapt to hold a ladder or other equipment. The storage rack can be used in vehicles, buildings or any other locations for storage.

U.S. Pat. No. 6,105,720 to Kumher et al. discloses a multi-position ladder, a longitudinally extending support member for supporting the ladder, and a connecting member connecting the support member and the ladder. The connecting member includes a sliding bar, a pivot bar, and a rotating arm, the sliding bar being in sliding engagement with the support member for permitting lateral shifting movement of the ladder along the support member to one of multiple generally vertical use positions, the pivot bar extending laterally outwardly from the sliding bar for permitting pivotable movement of the ladder about the pivot bar between a generally vertical use position and one of multiple storage positions, and the rotating arm providing tilting movement of the ladder towards or away from a wall to which the support member is attached. The ends of the rotating arm are slidably received in elongated slots in the uprights of the ladder for permitting sliding movement of the ladder relative to the rotating arm. A locking assembly permits selective securing of the free end of the ladder to the support member in a storage position.

BRIEF SUMMARY OF INVENTION

The present invention provides, and it is an object to provide, an improved ladder storage assembly.

There is accordingly provided a storage assembly for storing a foldable ladder within a structure. The assembly includes a first protrusion connectable to first rails of the ladder. The assembly includes a second protrusion connectable to second rails of the ladder. Each of the protrusions includes an enlarged distal end portion. The assembly includes a linear guide track connectable to the structure and to which the distal end portions of the protrusions are slidably received and retained when the ladder is in a folded position. The ladder couples to the structure thereby.

There is also provided a ladder storage assembly for a foldable ladder. The assembly includes a guide track having a longitudinally-extending slot and an enlarged slot portion. The assembly includes a pair of pin members with enlarged distal end portions shaped to fit through the enlarged slot portion and slidably engage with the guide track thereafter when the ladder is in a folded position.

There is further provided a method of storing a foldable ladder within a vehicle having a roof and an inside. The method includes coupling a guide track with an enlarged slotted portion to the roof of the vehicle within the inside thereof. The method includes coupling one or more pin members having enlarged distal end portions to first rails and second rails of the ladder such that the distal end portions align with each other when the ladder is in a folded position. The method includes inserting the distal end portion of a forward said pin member through the enlarged slotted portion and into the guide track, and thereafter pushing the ladder forward to enable the distal end portion of a rearward said pin member to align with the enlarged slotted portion of the guide track. The method includes inserting the distal end portion of the rearward said pin member through the enlarged slotted portion and into the guide track, and thereafter moving the distal end portion of the rearward said pin member away from the enlarged slotted portion of the guide track.

BRIEF DESCRIPTION OF DRAWINGS

The invention will be more readily understood from the following description of preferred embodiments thereof given, by way of example only, with reference to the accompanying drawings, in which:

FIG. 3 is a fragmentary, side elevation view of the ladder and ladder storage assembly of FIG. 1, with the assembly including a guide track having an enlarged slotted portion and with the first protrusion of FIG. 1 shown in the process of being inserted within the guide track via the enlarged slotted portion thereof;

FIG. 4 is a sectional view of the ladder storage assembly of FIG. 3 taken along lines 4-4, together with part of the ladder of FIG. 3 being shown in fragment, with a hydraulic damper of the ladder storage assembly also being shown;

FIG. 5 is a fragmentary, side elevation view of the ladder and ladder storage assembly of FIG. 3, with the first protrusion of the assembly shown inserted within the guide track and moving the hydraulic damper to a retracted position, with the second protrusion of the assembly shown in inserted within the enlarged slotted portion of the guide track;

FIG. 6 is a fragmentary, sectional view of the ladder storage assembly of FIG. 5 taken along lines 6-6, together with part of the ladder of FIG. 5 being shown in fragment and the hydraulic damper of the assembly also being shown;

FIG. 7 is a fragmentary, side elevation view of the ladder and ladder storage assembly of FIG. 5, with the protrusions of the assembly shown within the guide track, with the hydraulic damper shown in an extended position, and with the second protrusion of the assembly rearward of the enlarged slotted portion of the guide track and abutting a stop member of the assembly;

FIG. 13 is a perspective view of a first protrusion and mounting subassembly for a ladder storage assembly according to a second aspect;

FIG. 14 is a side elevation view of the first protrusion and mounting subassembly of FIG. 13;

FIG. 15 is a fragmentary, perspective view of an upper portion of a foldable ladder together with the first protrusion and mounting subassembly of FIG. 13 shown coupled thereto.

DESCRIPTION OF THE PREFERRED EMBODIMENTS

Figure 1:
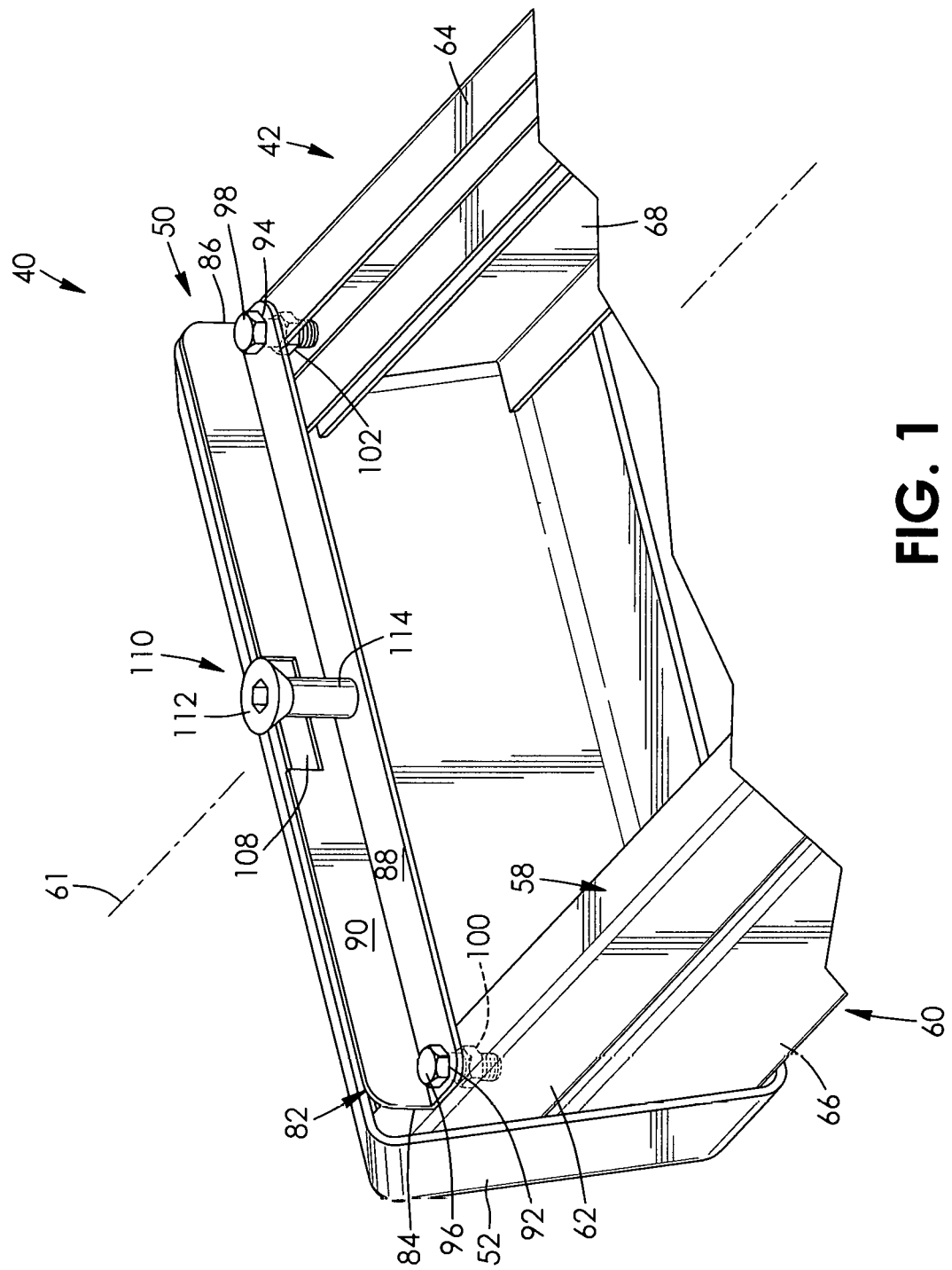
FIG. 1 is a side perspective view of an upper portion of a foldable ladder, the ladder being shown in fragment and in a folded position, together with an upper protrusion and mounting subassembly of a ladder storage assembly according to a first aspect.

Referring to the drawings and first to FIGS. 8 to 12, there is provided a storage assembly 40 for storing a foldable ladder 42 within a structure, in this example within a vehicle, in this case a van 44 on an inner top surface 46 of a roof 48 thereof.

Figure 2:
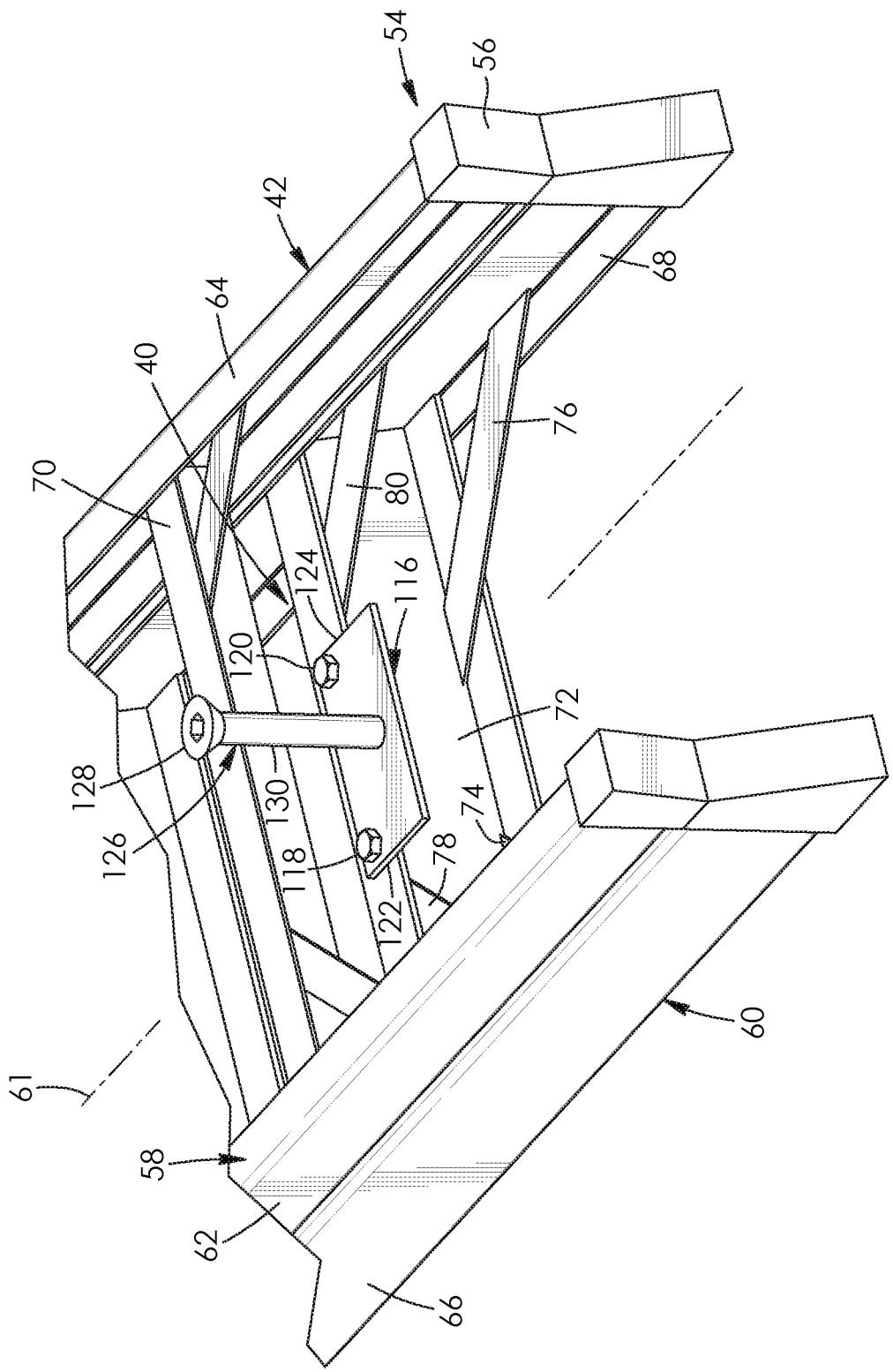
FIG. 2 is a side perspective view of a lower portion of the foldable ladder of FIG. 1 shown in fragment and in its folded portion, together with a lower protrusion and mounting subassembly of the ladder storage assembly of FIG. 1.
Figure 10:
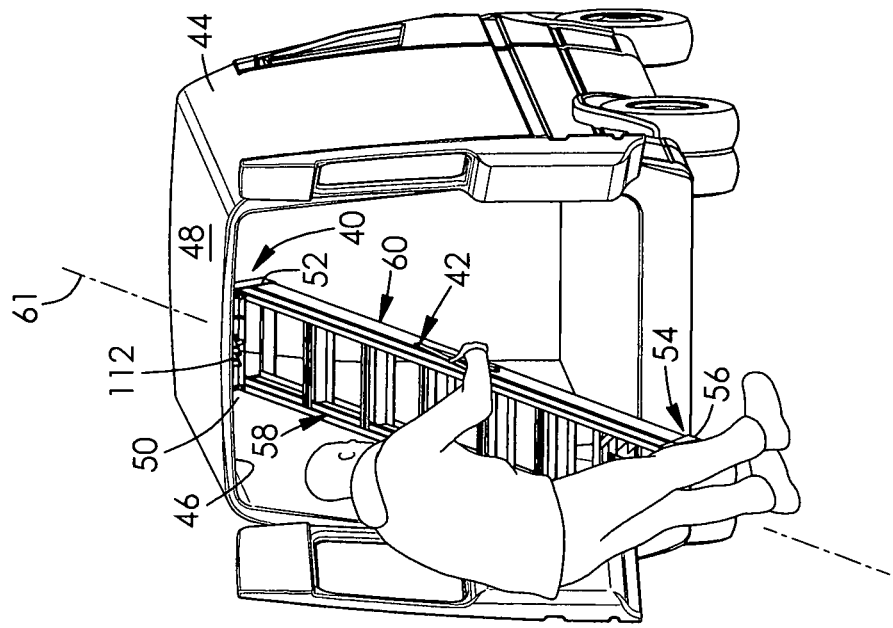
FIG. 10 is a rear, side perspective view of the van of FIG. 9, together with the person of FIG. 9 shown inserting the first protrusion of the ladder storage assembly into the enlarged slotted portion of the guide track of the ladder storage assembly.

As seen in FIG. 10, the foldable ladder is an A-frame type ladder in this example and has a top 50, includes a top plate or step 52 at the top thereof, has bottom 54, includes ladder shoes 56 at the bottom thereof, and has a front 58 and rear 60 which extend between the top and bottom thereof. The ladder has a horizontal axis 61 which extends from the bottom to the top thereof and which is positioned between the front and rear thereof. As best seen in FIG. 2, the ladder 42 includes a pair of first or front rails 62 and 64 that extend along front 58 thereof between the bottom 54 and top 52 thereof. The ladder includes a pair of second or rear rails 66 and 68 which extend along rear 60 thereof and which extend from the bottom to the top thereof. Referring to FIG. 3, the front rails 62 and 64 and the rear rails 66 and 68 pivotally connect together near top 52 of the ladder 42, and the ladder includes spreader bars 67 and 69, so as to enable the ladder to move from an unfolded position (not shown) in which bottom portions of the front and rear rails are spaced-apart from each other, to the folded position seen in FIG. 3.

Referring back to FIG. 2, the ladder 42 includes a plurality of spaced-apart horizontal members, in this example steps extending between the front rails, as shown by bottom step 70 in FIG. 2. The ladder includes a plurality of spaced-apart horizontal members, in this example steps extending between the rear rails, as shown by bottom step 72 in FIG. 2. The bottom steps each include braces in this example, as shown by braces 74, 76, 78 and 80 for step 72. Foldable ladders, including their various parts and functionings, are known and ladder 42 will thus not be discussed in further detail.

Referring to FIG. 1, the ladder storage assembly 40 includes an upper or first mount subassembly, in this example in the form of an elongate bracket 82. The bracket is L-shaped in this example, and has a pair of ends 84 and 86 that align with front rails 62 and 64, respectively. The bracket 82 includes a first plate 88 and a second plate 90 coupled to and extending perpendicular to the first plate. The first plate has apertures 92 and 94 extending therethrough adjacent to the ends 84 and 86 of the bracket in this example. The first plate 88 couples to front rails 62 and 64 via fasteners, in this example bolts 96 and 98, which extend through apertures 92 and 94 and engage with nuts 100 and 102. The bracket 82 thus couples to and extends between the front rails of the ladder 42 in this example and therefore couples to top step 52 of the ladder. The second plate 90 has an opening, in this example a cut-out portion 108 that is rectangular in shape and which is positioned between ends 84 and 86 of the bracket 82.

As seen in FIG. 1, the ladder storage assembly 40 includes a forward or first protrusion 110 that couples to the front rails 62 and 64 of the ladder 42 via bracket 82 in this example. The protrusion is positioned between the ends 84 and 86 of the bracket and aligns parallel with the longitudinal axis 61 of the ladder in this example. The first protrusion 110 includes a distal end portion or head 112 and an elongate member, in this example a shank or shaft 114 that couples the head thereof to plate 88 and thus ladder 42. The head of the protrusion is beveled, a frustum in shape in this example, and in the form of a fastener head in this example. The head 112 of the first protrusion 110 couples to and extends outwards from shaft 114.

Referring to FIG. 2, the ladder storage assembly 40 includes a lower or second mount subassembly, in this example a plate member 116 coupled to the rear rails 66 and 68 of the ladder 42 via bottom step 72. The plate member is rectangular in this example and has a pair of apertures 118 and 120 extending therethrough adjacent to sides 122 and 124 thereof.

The ladder storage assembly 40 includes a rearward or second protrusion 126 connectable to the rear rails 66 and 68 of the ladder 42 via the plate member 116. The second protrusion is similar to protrusion 110 in this example, and is positioned between the sides 122 and 124 of the plate member and aligns in parallel with the longitudinal axis 61 of the ladder in this example. The second protrusion 126 includes a distal end portion or head 128 and an elongate member, in this example a shaft 130 that couples the head thereof to plate 116 and thus ladder 42. Shaft 130 of protrusion 126 is longer than shaft 114 of protrusion 110 seen in FIG. 1. Referring back to FIG. 2, the head 128 of protrusion 126 is beveled, a frustum in shape in this example, and in the form of a fastener head in this example. The head of the second protrusion 126 couples to and extends radially outwards from shaft 130.

Referring to FIG. 5, the protrusions 110 and 126 of the ladder foldable assembly 40 are shaped such that the heads 112 and 128 thereof align with each other parallel to axis 61 when the ladder 42 is in its folded position in this example. The protrusions may comprise fasteners that threadably couple to the ladder, with positioning of the heads of the protrusions relative to the ladder being threadably adjustable thereby.

Figure 8:
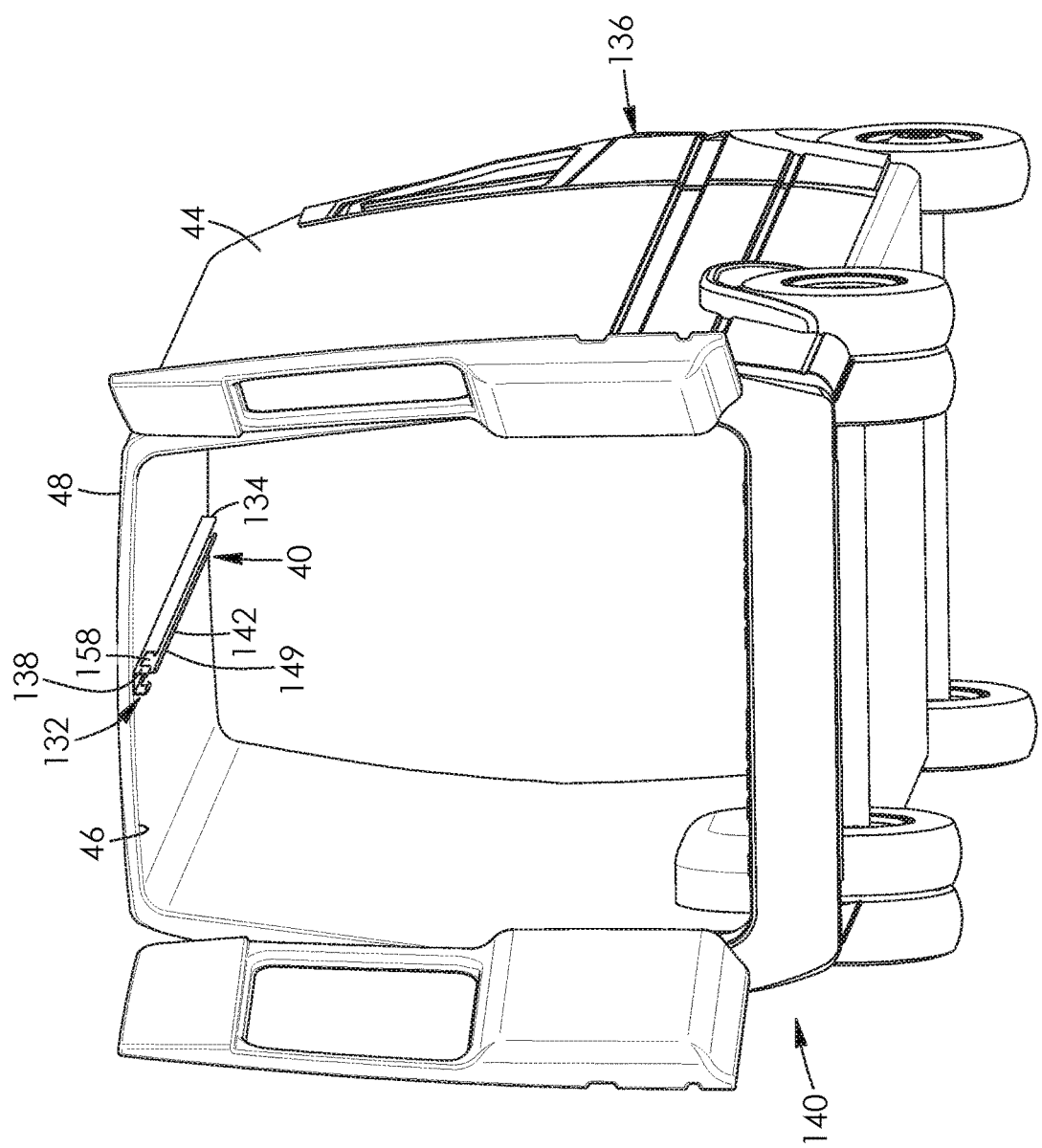
FIG. 8 is a rear, side perspective view of a van with its rear doors open to show the guide track of the ladder storage assembly of FIG. 7 mounted to the inner top surface of the roof of the van.

As seen in FIG. 8, the ladder foldable assembly 40 includes a guide track 132. The guide track in this example is a channel in the form of a straight strut channel. The guide track 132 is connectable to the inner top surface 46 of the roof 48 of the van 44. The guide track has a first or forward end 134 pointing towards the front 136 of the van, a second or rearward end 138 adjacent to the rear 140 of the van, and a longitudinally-extending opening or slot 142 at the bottom of the guide track which extends between the forward and rearward ends thereof.

As seen in FIG. 6, the guide track 132 comprises an upper elongate member or plate 144 having a pair of peripheral edge portions 146 and 148, has a bottom 149, and includes a pair of elongate side members 150 and 152 which couple to and extend perpendicularly downwards from the peripheral edge portions of the plate to said bottom. Each of the side members includes distal catches, in this example distal hook-shaped, inwardly-extending edge portions 154 and 156.

As seen in FIGS. 3 and 4, the slot 142 of the guide track 132 is shaped to receive the shafts 114 and 130 of the protrusions 110 and 126. The slot of the guide track is shaped to be too narrow to permit the heads 112 and 128 of the protrusions from passing therethrough. The guide track 132 has an enlarged aperture, in this example an enlarged slot portion 158 through which the heads 112 and 128 of protrusions 110 and 126 can pass for positioning the protrusions within the guide track. The heads of the protrusions are slidably received and retained within the guide track 132 thereafter. The protrusions may be referred to as a pair of pin members with enlarged heads shaped to fit through the enlarged slot portion and slidably engage with the guide track thereafter.

Referring to FIGS. 3 and 4, the ladder storage assembly 40 includes a biasing member, in this example a hydraulic damper 160. The hydraulic damper includes an outwardly-biased piston 162 that slidably engages with and is received within a cylinder 164. The hydraulic damper in this example is positioned within the guide track 132 in this example adjacent to end 134 thereof. However, this is not strictly required and the hydraulic damper may be positioned adjacent to the guide track near end 134 in other embodiments for example. Also, the biasing member need not be a hydraulic damper may take other forms in other embodiments. Referring to FIG. 3, the hydraulic damper 160 may be positioned level with or, in this case, above the bottom 149 of the guide track 132.

As seen in FIG. 5, the piston 162 includes a distal end 165 that is circular in this example and configured to engage with the head 112 of the first protrusion 110 positioned within the guide track 132. The head 128 of the second protrusion 126 is configured to fit within the enlarged slot portion 158 of the guide track and enter within the guide track only upon the head of the first protrusion member is acting against and compressing the piston as seen by arrow of numeral 168 in FIG. 5. Upon the head of the second protrusion entering within the guide track and the ladder thereafter being released by the user, the hydraulic damper biases the head 112 of the first protrusion 110, as shown by arrow of numeral 170 in FIG. 7, and thus the head 128 of the second protrusion 126, rearward and away from the enlarged slot portion 158 of the guide track 132. Inadvertent dislodgement of the ladder from the guide track is inhibited thereby. The head of the second protrusion abuts stop member 159 positioned rearward of the slot portion. The stop member is positioned within the guide track 132, is a rectangular prism in shape in this example and extends within the guide track to inhibit sliding therethrough. To remove the ladder 42, the above steps are taken in reverse, with the ladder being pushed forward towards the front of the van, until the head 128 of the second protrusion 126 passes through enlarged slot portion 158 and is then removed from the guide track. The ladder may thereafter be pulled outwards from the rear of the van until the head 112 of the first protrusion 110 passes through the enlarged slot portion 158.

Figure 9:
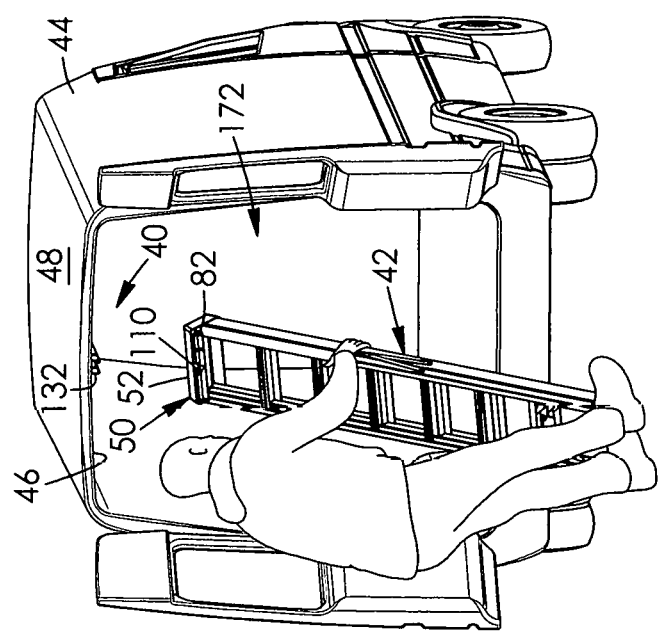
FIG. 9 is a rear, side perspective view of the van of FIG. 8, together with a person gripping the ladder of FIG. 1 in its folded position and elevating the upper portion of the ladder towards the guide track of the ladder storage assembly.

Thus, and referring to FIG. 9, there is provided a method of storing the foldable ladder 42 within van 44. The method includes coupling the guide track 132 to the roof 48 of the van within the inside 172 thereof. Referring to FIG. 3, the method includes coupling the first protrusion 110 and second protrusion 126 to front rails 62 and rear rails 66 of the ladder 42, such that the heads 112 and 128 of the protrusions align with each other when the ladder is in a folded position. Referring to FIGS. 3 and 10, the method includes inserting the head 112 of the first protrusion through the enlarged slotted portion 158 and into the guide track 132. The method includes next pushing the ladder forward, as shown by arrow of numeral 174, to enable the head 128 of the second protrusion 126 to align with the enlarged slotted portion of the channel, as seen in FIG. 5. The method includes inserting the protrusion of the second protrusion through the enlarged slotted portion and into the guide track.

Figure 12:
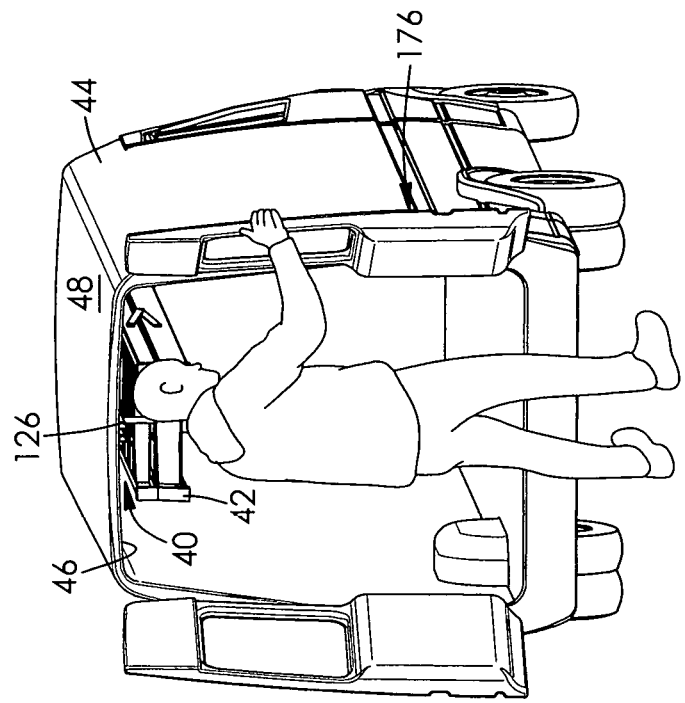
FIG. 12 is a rear, side perspective view of the van of FIG. 11, together with the person of FIG. 11, with the ladder shown fully stored within the van and mounted to the roof of the van via the ladder storage assembly.
Figure 11:
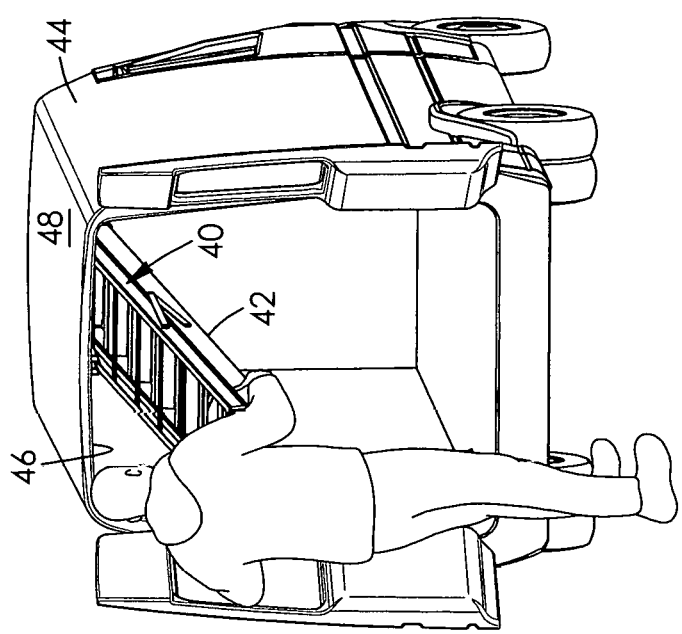
FIG. 11 is a rear, side perspective view of the van of FIG. 10, together with the person of FIG. 10 shown pushing the ladder so slidably engaged to the guide track via the first protrusion of the ladder storage assembly, further into the van so as to slidably couple the second protrusion to the guide track.

The method further includes disposing hydraulic damper 160 within the guide track 132 such that insertion of the head 128 of the second protrusion 126 through the enlarged slotted portion 158 of the guide track is only possible by first pushing the head 112 of the first protrusion 110 against the hydraulic damper so as to move the piston 162 to the retracted position seen in FIG. 5. When the head 128 of the second protrusion 126 is within the guide track 132, the method next includes releasing the ladder as seen in FIG. 12. Referring to FIG. 7, this causes the hydraulic damper 160 to move the head 128 of the second protrusion 126 towards the rear 176 of the van 44, seen in FIG. 12, and away from the enlarged slotted portion 158 of the guide track 132 seen in FIG. 7. The above steps may be followed in reverse to remove the ladder 42 from the vehicle 44 thereafter.

The ladder storage assembly 40 as herein described may enable the vehicle to be more roomy when the ladder is removed therefrom as seen in FIG. 8. Referring to FIG. 7, the protrusions so coupled to the ladder ensure that only a compact rail remains within the vehicle when the ladder is not therewithin.

FIGS. 13 to 15 show a first mount subassembly 82.1 of a ladder storage assembly 40.1 according to a second embodiment. Like parts have like numbers and function as the embodiment shown in FIGS. 1 to 12 with the addition of ".1". Ladder storage assembly 40.1 is substantially the same as the assembly 40 shown in FIGS. 1 to 12 with the following exceptions.

In this embodiment, the subassembly 82.1 includes a pair of hollow protuberances that are tubular in shape, in this example sleeves 178 and 180. The sleeves couple to plate 90.1 and are aligned adjacent to ends 84.1 and 86.1 of the subassembly in this example. As seen in FIG. 14, the subassembly 82.1 is approximately c-shaped in side profile in this example. Referring to FIG. 15, the sleeves 178 and 180 and plates 88.1 and 90.1 are configured such that plate 88.1 aligns with and extends substantially in parallel with rails 62.1 and 64.1 when the ladder is in its folded position seen in FIG. 15.

Referring to FIG. 15, the top step 52.1 of ladder 42.1 includes a pair of recesses 182 and 184 extending therethrough and through which are received sleeves 178 and 180. Ladder 42.1 may be a Werner®-type ladder in this example.

The subassembly 82.1 couples to the top step 52.1 via a pair of fasteners, in this example carriage-type bolts 186 and 188 with bolt heads 190 and 192 which abut an upper planar surface 194 of the top step. The bolts extend through the sleeves 178 and 180 with threaded ends 194 and 196 of the bolts extending outwards from the planar underside 198 of the top step 52.1. Nuts 200 and 202 couple to the threaded ends of the bolts, with washers 204 and 206 abutting the underside of the top step and being interposed between the top step and nuts in this example. In this manner, subassembly 82.1 selectively couples to the top 50.1 of ladder 42.1.

Figure 16:
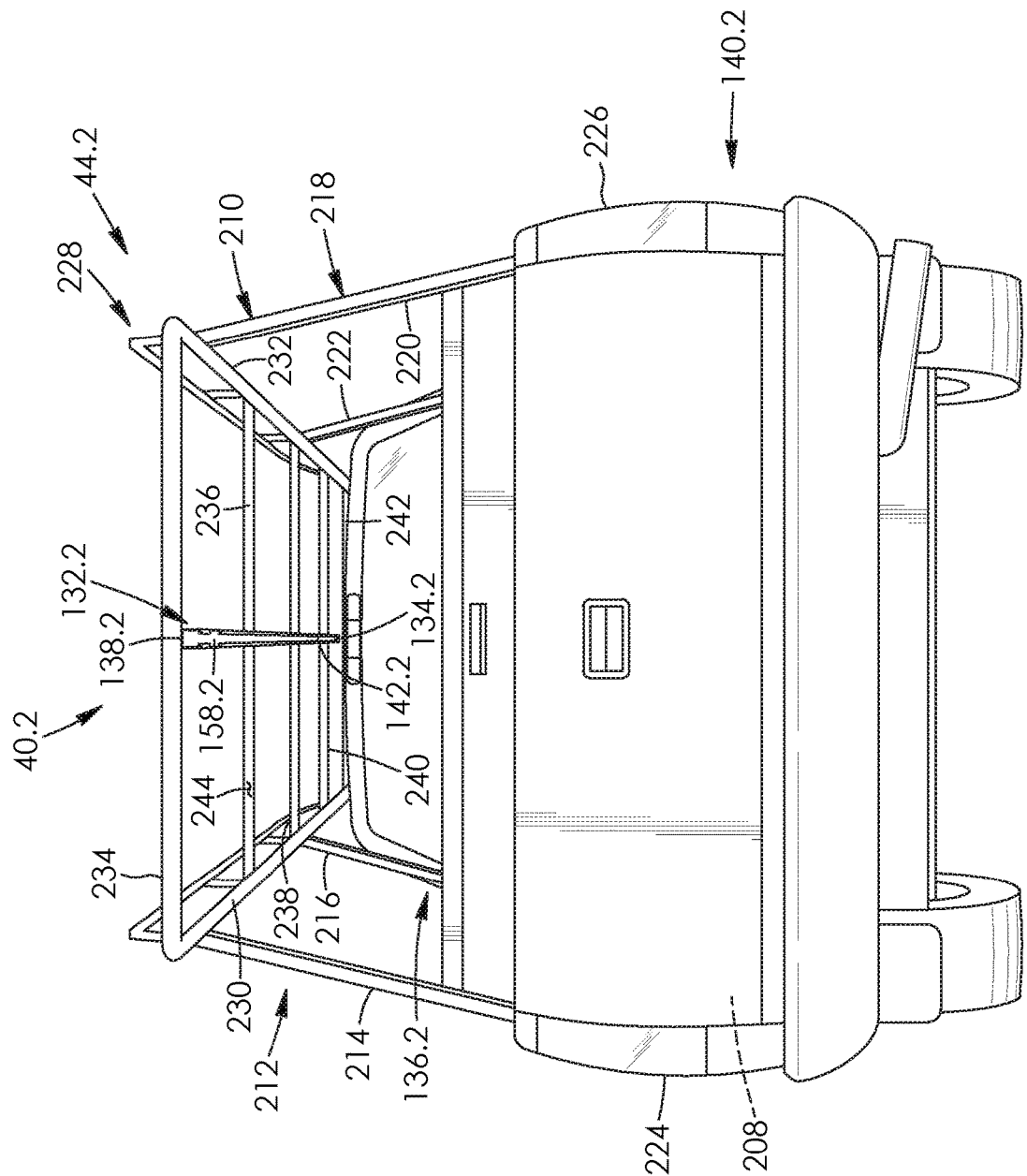
FIG. 16 is a rear perspective view of a pickup truck having a rear bed and a truck rack coupled to the rear bed, together with a guide track of a ladder storage assembly according to a third embodiment, the guide track being shown coupled to the truck rack.

FIG. 16 shows a guide track 132.2 of a ladder storage assembly 40.2 according to a third embodiment. Like parts have like numbers and function as the embodiment shown in FIGS. 1 to 12 with the addition of ".2". Ladder storage assembly 40.2 is substantially the same as the assembly 40 shown in FIGS. 1 to 12 with the following exceptions.

In this embodiment, a vehicle in the form of a pickup truck 44.2 is shown. The truck has a rear bed 208 with auxiliary framing, in this example an open/overhead rack or in the form of truck rack 210 coupled thereto. However, this is not strictly required and the auxiliary framing may be in the form of a camper shell in another example. The truck rack includes a first side frame subassembly 212 comprising in this example vertically-extending, spaced-apart frames 214 and 216. The truck rack 210 includes a second side frame subassembly 218 comprising in this example vertically-extending, spaced-apart frames 220 and 222. The side frame subassemblies couple to and extend in parallel with sides 224 and 226 of the truck 44.2 in this example.

The truck rack 210 includes a roof subassembly 228 comprising a first horizontally-extending side frame 230 coupling to and extending between frames 214 and 216, and a second horizontally-extending side frame 232 coupling to and extending between frames 220 and 222. The side frames 230 and 232 are configured to extend in parallel with the sides 224 and 226 of the truck 44.2 in this example. The roof subassembly includes in this example a plurality of horizontally-extending, spaced-apart cross-member frames 234, 236, 238, 240 and 242 which couple to, extend between and extend perpendicular to side frames 230 and 232 thereof. Frames 234, 236, 238, 240 and 242 are configured to extend in parallel with the rear 140.2 of the truck 44.2 in this example.

The ladder storage assembly 40.2 includes guide track 132.2 which couples to and extends along the underside or bottom portions 244 of frames 234, 236, 238, 240 and 242 of the roof subassembly 228. Each of the bottom portions of the frames may be referred to as an inner top surface of the truck rack 210. The guide track is centrally positioned between the side frame subassemblies 212 and 218 in this example, and extends from the rear 140.2 of the truck 44.2 towards the front 136.2 of the truck. The guide track 132.2 and protrusions of the ladder, such as those shown in FIGS. 1 to 12, are otherwise substantially similar in parts and functions as has been previously described. In this manner, ladder storage assembly 40.2 is adapted to be used in association with canopies of pickup trucks, for example.

It will be appreciated that many variations are possible within the scope of the invention described herein. For example, those skilled in the art will appreciate that the ladder storage assembly as herein described may also be used for other walled or planar surfaces for other applications, such as for and within garages, storage sheds and the like.

It will also be understood by someone skilled in the art that many of the details provided above are by way of example only and are not intended to limit the scope of the invention which is to be determined with reference to the following claims.

What is claimed is:

1. A storage assembly for storing a foldable ladder within a structure, the assembly comprising:
   a first protrusion connectable to first rails of the ladder;
   a second protrusion connectable to second rails of the ladder, each of the protrusions including an enlarged distal end portion;
   a biasing member; and
   a linear guide track connectable to the structure and to which the distal end portions of the protrusions are slidably received and retained when the ladder is in a folded position, the biasing member being configured to engage with the distal end portion of a forward said protrusion when the distal end portion of the forward said protrusion is positioned within the guide track, and the distal end portion of a rearward said protrusion being configured to fit within an enlarged slot portion of the guide track and enter within the guide track only upon the forward said protrusion acting against the biasing member, the ladder coupling to the structure thereby.

2. The assembly as claimed in claim 1 wherein each said protrusion includes an elongate member that couples the distal end portion thereof to the ladder, and wherein the guide track has a longitudinally-extending slot, the longitudinally-extending slot being shaped to enable the elongate members to slidably pass therethrough and inhibit the distal end portions of the protrusions from passing therethrough.

3. The assembly as claimed in claim 1 wherein each of the protrusions includes a shaft that couples the distal end portion thereof to the ladder, the distal end portions of the protrusions coupling to and extending outwards from said shafts, and the shaft of the second protrusion being longer than the shaft of the first protrusion.

4. The assembly as claimed in claim 1 wherein the distal end portions of the protrusions are beveled.

5. The assembly as claimed in claim 1, the ladder having a longitudinal axis and wherein the protrusions align in parallel with the longitudinal axis of the ladder.

6. The assembly as claimed in claim 1 wherein the guide track has an enlarged aperture through which respective ones of the protrusions pass for positioning the distal end portions of the protrusions within the guide track.

7. The assembly as claimed in claim 1 wherein the assembly includes a first mount subassembly coupling to and extending between the first rails of the ladder, the first protrusion coupling to the ladder via the first mount subassembly, and wherein the assembly includes a second mount subassembly coupled to the second rails of the ladder, the second protrusion coupling to the ladder via the second mount subassembly.

8. The assembly as claimed in claim 7 wherein the first mount subassembly comprises a bracket which extends between and couples to respective said first rails of the ladder via fasteners.

9. The assembly as claimed in claim 7 wherein the first mount subassembly comprises one or more protuberances which fit within one or more apertures of a top step of the ladder, with the first mount subassembly coupling to the ladder thereby.

10. The assembly as claimed in claim 9 wherein the one or more protuberances are one or more sleeves, and wherein the assembly further includes one or more fasteners which extend through the one or more sleeves and couple the first mount subassembly to the top step of the ladder.

11. The assembly as claimed in claim 1, wherein the first protrusion couples to a top step of the ladder extending between the first rails and wherein the second protrusion couples to a bottom horizontal member of the ladder extending between the second rails.

12. In combination, a ladder and the assembly as claimed in claim 1.

13. The combination as claimed in claim 12, wherein the first protrusion of the assembly couples to the first rails of the ladder and wherein the second protrusion of the assembly couples to the second rails of the ladder.

14. In combination, a vehicle, and the assembly as claimed in claim 1, wherein the structure to which the guide track couples is a roof of the vehicle, with the guide track coupling to an inner top surface of the roof of the vehicle.

15. In combination, auxiliary framing for a rear bed of a pickup truck and the assembly as claimed in claim 1, the guide track coupling to an underside of said auxiliary framing.

16. The assembly as claimed in claim 1, wherein the guide track has a bottom, wherein the biasing member is positioned level with or above said bottom of the guide track, and wherein the biasing member is enclosed within the guide track.

17. The assembly as claimed in claim 1, wherein each said distal end portion of the protrusions is a frustum in shape.

18. The assembly as claimed in claim 1, the first rails of the ladder extending along a front of the ladder and extending from a bottom of the ladder to a top of the ladder, the second rails of the ladder extending along a rear of the ladder from the bottom of the ladder to the top of the ladder, the first rails and the second rails pivotally connecting together, and wherein the distal end portions of the protrusions align with each other when the ladder is in the folded position.

19. The assembly as claimed in claim 1 wherein upon the rearward said protrusion entering within the guide track and the ladder thereafter being released, the biasing member biases the forward said protrusion rearward and thus the rearward said protrusion rearward and away from the enlarged slot portion of the guide track, with inadvertent dislodgement of the ladder from the guide track being inhibited thereby.

* * * * *